United States Patent [19]

Frankfurter

[11] Patent Number: 5,059,367
[45] Date of Patent: Oct. 22, 1991

[54] ALUMINUM OXIDE TUBES AND PROCESS FOR THEIR MANUFACTURE

[75] Inventor: Günter Frankfurter, Marktredwitz, Fed. Rep. of Germany

[73] Assignee: Hoechst CeramTec Aktiengesellschaft, Selb, Fed. Rep. of Germany

[21] Appl. No.: 302,982

[22] Filed: Jan. 30, 1989

Related U.S. Application Data

[63] Continuation-in-part of Ser. No. 257,019, Oct. 13, 1988, abandoned.

[30] Foreign Application Priority Data

Oct. 15, 1987 [DE] Fed. Rep. of Germany ....... 3734914

[51] Int. Cl.$^5$ .............................................. C04B 35/10
[52] U.S. Cl. ......................................... 264/60; 264/63
[58] Field of Search ..................................... 264/63, 60

[56] References Cited

U.S. PATENT DOCUMENTS

| | | | |
|---|---|---|---|
| 4,150,317 | 4/1979 | Laska et al. | 313/221 |
| 4,169,875 | 10/1979 | Laska et al. | 264/63 |
| 4,222,978 | 9/1980 | Oda et al. | 264/65 |
| 4,396,595 | 8/1983 | Heytmeijer et al. | 423/625 |
| 4,415,485 | 11/1983 | Voigt et al. | 502/100 |
| 4,471,712 | 9/1984 | Voigt et al. | 118/50 |
| 4,629,593 | 12/1986 | Groh et al. | 264/63 |
| 4,799,601 | 1/1989 | Shimai et al. | 264/313 |

FOREIGN PATENT DOCUMENTS

| | | |
|---|---|---|
| 2810265 | 9/1978 | Fed. Rep. of Germany . |
| 3034957 | 4/1982 | Fed. Rep. of Germany . |
| 3201750 | 9/1982 | Fed. Rep. of Germany . |

*Primary Examiner*—James Derrington
*Attorney, Agent, or Firm*—Foley & Lardner

[57] ABSTRACT

A process is described for the manufacture of a gas-tight aluminum oxide tube which is suitable for performing catalytic high-temperature reactions. For this purpose water, a binder and a plasticizer are added to aluminum oxide powder, the mixture is extruded to give a tubular green body and the tube is dense-sintered at about 1740° C.

An aqueous suspension of aluminum oxide is obtained by grinding aluminum oxide, and a spray powder of a maximum particle size of 200 μm is prepared therefrom. Presintering takes place at a temperature T between 1300° and 1400° C. and grinding takes place with water and a water-soluble stabilizing agent. The aqueous suspension is sprayed and the resultant spray powder is treated with water and a plasticizer, the mixture is kneaded to give a plastic mass and this mass is extruded to give a tubular green body which is also presintered at the temperature T. The presintered tube is then immersed in water, briefly dried and the mixture consisting of water/stabilizing agent/spray powder is applied to the interior of the tube. The remainder is poured off, and the internally coated tube is dried and finally dense-sintered at about 1740° C. A tube results with an Al$_2$O$_3$ content of greater than 98%. The roughness of the coating on the interior is 2–10 μm.

16 Claims, No Drawings

ALUMINUM OXIDE TUBES AND PROCESS FOR THEIR MANUFACTURE

This application is a continuation-in-part of application Ser. No. 07/257,019, filed Oct. 13, 1988, now abandoned.

The present invention relates to gas-tight tubes made from aluminum oxide ceramic material with an interior coating. Gas-tight ceramic tubes are used in the BMA process at high temperatures to convert a mixture of methane and ammonia catalytically to hydrogen cyanide and hydrogen (compare Chemie-Technik 1978, p. 231). The conversion is carried out on a platinum catalyst which has been applied to the interior of an aluminum oxide tube. The tubes are suspended inside a combustion chamber and are maintained at about 1250° C.

The tubes employed must be gas-tight and resistant to high temperatures. Furthermore, their interior must be capable of taking up the required amount of platinum per unit area. The coating of an $Al_2O_3$ catalyst tube with a platinum solution is described in Example 1 of DBP 3,034,957. The process has the shortcoming that in each case only a part of the required platinum may be applied in one drying operation. For this reason the application of the catalytic metal to the interior of the tube requires several drying operations. The manufacture of aluminum oxide tubes which are suitable for the BMA process and which are assigned to the material classes KER 708 and KER 710 according to DIN 40685, has been known for a long time as the state of the art. The object has been to form these tubes in such a manner that the coating process can be carried out in fewer operations.

The invention is based on the knowledge that the problem may be overcome by increasing the surface roughness on the interior of the tube. Aluminum oxide tubes having a minimum $Al_2O_3$ content of 80% which have been produced by vacuum extrusion and subsequent sintering usually have a surface roughness $R_a$ of 1.0 to 1.5 μm.

A process has now been found for the manufacture of a gastight aluminum oxide tube which is suitable for performing catalytic high-temperature reactions, in which process water and a binder and plasticizer are added to the aluminum oxide powder, the mixture is extruded to give a tubular green body, the tube is dense-sintered at 1720°-1760° C. and the sintered tube is optionally impregnated with a solution containing catalytically active metal ions, wherein a) an aqueous suspension of aluminum oxide powder is obtained by grinding the aluminum oxide, a spray powder of a maximum particle size of 200 μm is produced therefrom by spraying, the spray powder is presintered at a temperature between 1300° and 1400° C., the presintered spray powder is ground with water and a watersoluble stabilizing agent until the grinding residue left behind on a sieve of 63 μm inside mesh size is 0.2 to 0.4% by weight, b) the aqueous suspension from stage a) is spray-dried, and water and a plasticizer are added to the resultant spray powder, the mixture is kneaded to give a plastic mass and this mass is extruded to give a tubular green body and the extruded tubular green body is also presintered at a temperature between 1300° and 1400° C.

c) the presintered tube is immersed in water in order to fill the pores with water, the tube is briefly dried in order to expel a small part of the water from the pores, the ground mixture consisting of water/stabilizing agent/spray powder is applied to the interior of the tube and the non-adhering residue is poured off and d) the tube with its coated interior is dried and finally dense-sintered.

The manufacture of aluminum oxide tubes has been known for many years. Examples of the manufacture of transparent aluminum oxide tubes may be found, for example, in DE-OS 3,201,750, DE-OS 2,810,128, US-PS 4,396,595 and in European Application 134,277. Since in the present case the transparency of the tubes is not under consideration, inorganic dopants, such as magnesium and zirconium, may be dispensed with.

The purity of the aluminum oxide used should be at least 90%, preferably at least 95%. Best results are obtained with a purity of $99\pm1\%$.

The first grinding of aluminum oxide in stage a) is best carried out until gas-tightness can be achieved in the later firing at 1720°-1760° C. This is the case at a mean particle diameter below 15 μm, particularly from 2 to 5 μm. The spraying procedure in stage a) is preferably carried out after the addition of a binder, since then a uniform powder results with only a small proportion of very fine material. The water-soluble stabilizing agent is usually an organic compound which decomposes during the sintering process without leaving a residue. Compounds which may be used for this purpose, are, for example, polyvinyl alcohol, polyvinyl acetate dispersion or polyethylene glycol. All these compounds increase the viscosity of the solution and thus prevent the high-density aluminum oxide settling out.

The spraying in stage b) is preferably carried out without the addition of a binder. Plasticizers usually employed in stage b) are high-molecular organic compounds such as polyvinyl alcohol and/or methylcellulose or water-soluble starches (dextrin). The tubes are usually produced by extrusion; however, the tube may be also produced by isostatic pressing, but this is not customary for reasons of cost. It is essential that the presintering of the tubular green body according to step b) and the presintering of the sprayed powder according to step a) are carried out in the same temperature range of from 1300° to 1400° C. Advantageously the difference between the temperature of presintering the sprayed powder and presintering of the tubular green body is at most 70 K, better at most 50 K, especially at most 20 K.

Furthermore, the composition of the presintered spray powder and the presintered tubular green body should be the same.

The water content of the moist tube is obtainable from the weights of the presintered tube and that of the tube after immersion in water. "A small part" of the water which is to be removed by drying, is understood to mean 2 to 10, preferably 3 to 8%, of the water. Even if still greater proportions of the water are removed from the pores by drying, the interior remains coated. However, with increasing absorptive power of the tube it becomes increasingly difficult to reproduce a constant coating thickness. The thickness to aim for is a thickness of the (sintered) interior coating from 0.03 to 0.25 mm, in particular from 0.05 to 0.15 mm. Greater thicknesses are possible, but they represent no advantages for the catalytic reactions. Furthermore, an increasing coating thickness constitutes the danger that stresses may form between the coating and the body of the tube during drying and sintering which may lead to the coating becoming detached. The solids content of the aqueous coating mass is about 30 to 50% by weight. Thinner masses may be also used, provided that a sufficiently effective organic stabilizing agent has been used. With a decreasing proportion of aluminum oxide the proportion of stabilizing agent must be increased in order to prevent settling out.

The tubes which have been coated by the process according to the invention have an interior surface roughness $R_a$ of 2 to 10 μm, preferably 3 to 6 μm. The roughness may be varied by varying the grinding time of the presintered spray powder in water with a water-soluble stabilizing agent. Reducing the grinding time increases the roughness, extending the grinding time reduces it.

When the tube has been produced by extrusion, the surface roughness $R_a$ is at most about 1 to 1.5 μm. The operation of coating the catalyst may be distinctly shortened by the process according to the invention. One operation is usually sufficient. Furthermore, a measurable increase of the specific yield of the BMA process takes place.

The invention is elucidated in greater detail by the Example.

EXAMPLE

Aluminum oxide powder of 99% purity is comminuted by wet grinding in an Alsing cylinder. The mean particle diameter resulting from this wet grinding ($d_{50}$ value) is about 3 μm. To convert it into tubes, the Al$_2$O$_3$ powder suspension is spray-dried, formed into a paste with water and a plasticizer and vacuum extruded to form tubes. The tubes have an exterior diameter of 22 mm, an interior diameter of 17 mm and a length of 2.1 m. The tubes are dried and presintered at 1350° C. They then possess a water absorbing capacity of 10 to 15% by weight. Their strength (bending strength) is from about 110 to 170 N/mm$^2$.

For further processing to produce the interior coating, the initial suspension of the wet-ground Al$_2$O$_3$ powder is spray dried after the addition of 10% of polyglycol. A granular mass with a particle size distribution of up to 200 μm results.

Presintering also takes place at 1350° C. In order to obtain the desired surface roughness, a defined wet grinding is carried out. For this purpose 8 kg of the grinding body (Al$_2$O$_3$) of up to 22 mm in diameter, 4 kg of presintered spray granules, 4 liters of water and 0.8 kg of polyethylene glycol 20,000 were introduced in a porcelain Alsing cylinder and then ground. A sieve residue of 0.3% was left behind on a sieve of 63 μm inside mesh size after 10 hours.

The presintered tubes were placed in water for 10 minutes in order to saturate the open pores. The tubes were then allowed to dry for 20 minutes at room temperature. The coating suspension obtained by grinding was applied to the interior of the tubes and immediately poured out again. A thin uniform coating on the interior surface of the tube results.

The tubes are then dried at 50° C. and fired at 1740° C. The tube and the applied coating are sintered thereby.

We claim:

1. A process for the manufacture of a gas-tight aluminum oxide tube which is suitable for performing catalytic high-temperature reactions, in which process water and a binder and plasticizer are added to aluminum oxide powder, the mixture is extruded to give a tubular green body, and said tubular green body is dense-sintered at 1720° to 1760° C., wherein
   a) an aqueous suspension of aluminum oxide powder is obtained by grinding said aluminum oxide, producing a spray powder of a maximum particle size of 200 μm therefrom by spraying, presintering said spray powder at a temperature between 1300° and 1400° C., and grinding said presintered spray powder with water and a water-soluble stabilizing agent until the grinding residue left behind on a sieve of 63 μm inside mesh size is 0.2 to 0.4% by weight,
   b) the aqueous suspension obtained from stage a) is spray-dried, water and plasticizer are added to the resultant spray powder, the mixture is kneaded to give a plastic mass, said mass is extruded to give a tubular green body and said extruded tubular green body is also presintered at a temperature between 1300° and 1400° C.,
   c) the resultant presintered tube is immersed in water in order to fill the pores of said tube with water, said tube is briefly dried in order to expel a small part of said water from said pores, the aqueous suspension prepared in step a) is applied to the interior of said tube and the non-adhering residue is poured off, and
   d) said tube with its coated interior is dried and finally dense-sintered.

2. A process as claimed in claim 1, wherein said sintered tube is impregnated with a solution containing catalytically active metalions.

3. A process as claimed in claim 1, wherein the purity of said aluminum oxide is at least 90%.

4. A process as claimed in claim 3, wherein the purity of said aluminum oxide is at least 95%.

5. A process as claimed in claim 4, wherein the purity of said aluminum oxide is about 99%.

6. A process as claimed in claim 1, wherein said ground aluminum oxide has a mean particle diameter of less than 15 μm.

7. A process as claimed in claim 6, wherein said ground aluminum has a mean particle diameter between 2 and 5 μm.

8. A process as claimed in claim 1, wherein said aqueous suspension of aluminum oxide is sprayed after addition of a binder.

9. A process as claimed in claim 8, wherein said binder is an organic compound which decomposes during the sintering process without leaving a residue.

10. A process as claimed in claim 9, wherein said binder is polyvinyl alcohol, polyvinyl acetate dispersion or polyethylene glycol.

11. A process as claimed in claim 1, wherein said plasticizer is polyvinyl alcohol, methylcellulose or dextrin.

12. A process as claimed in claim 1, wherein the difference in temperature of presintering said sprayed powder and presintering said tubular green body does not exceed 70 K.

13. A process as claimed in claim 12, wherein said temperature difference does not exceed 50 K.

14. A process as claimed in claim 13, wherein said temperature difference does not exceed 20 K.

15. A process as claimed in claim 1, wherein from 2 to 10% of said water is removed from said pores by drying.

16. A process as claimed in claim 15, wherein 3 to 8% of said water is removed from said pores by drying.

* * * * *

UNITED STATES PATENT AND TRADEMARK OFFICE
CERTIFICATE OF CORRECTION

PATENT NO. : 5,059,367
DATED : Oct. 22, 1991
INVENTOR(S) : Guenter Frankfurter It is certified that error appears in the above-identified patent and that said Letters Patent is hereby corrected as shown below:

On the title page, item [75] Inventor: after "Germany" insert the following:
--; Reinhard Manner, Maintal, Fed. Rep. of Germany --

Signed and Sealed this

Twenty-eighth Day of September, 1993

Attest:

BRUCE LEHMAN

*Attesting Officer*    *Commissioner of Patents and Trademarks*